US006959952B2

(12) United States Patent
Williams

(10) Patent No.: US 6,959,952 B2
(45) Date of Patent: Nov. 1, 2005

(54) OBJECT GRIPPING DEVICE AND OPENER

(76) Inventor: Steven A. Williams, 1995 Ferndale Pl., Thousand Oaks, CA (US) 91360

( * ) Notice: Subject to any disclaimer, the term of this patent is extended or adjusted under 35 U.S.C. 154(b) by 0 days.

(21) Appl. No.: 10/733,824

(22) Filed: Dec. 11, 2003

(65) Prior Publication Data

US 2004/0124649 A1 Jul. 1, 2004

Related U.S. Application Data

(63) Continuation-in-part of application No. 10/329,659, filed on Dec. 26, 2002, now abandoned.

(51) Int. Cl.$^{7}$ ............................ B25J 15/00; B67B 7/18

(52) U.S. Cl. .................. 294/86.4; 294/103.1; 294/902; 81/3.43

(58) Field of Search ............................ 294/86.4, 119.2, 294/103.1, 902, 104; 81/3.43, 64

(56) References Cited

U.S. PATENT DOCUMENTS

| | | | | | |
|---|---|---|---|---|---|
| 1,890,227 | A | * | 12/1932 | McKee | 81/64 |
| 2,780,951 | A | * | 2/1957 | Bram | 81/64 |
| 2,937,548 | A | * | 5/1960 | McKim | 81/3.43 |
| 3,838,615 | A | * | 10/1974 | McFarland et al. | 81/64 |
| 3,964,115 | A | * | 6/1976 | Platek | 7/152 |
| 4,615,656 | A | * | 10/1986 | Geraghty, Jr. | 414/607 |
| 5,203,236 | A | * | 4/1993 | Anderson | 81/3.2 |
| 5,310,233 | A | * | 5/1994 | Pollard et al. | 294/86.4 |
| 5,833,224 | A | * | 11/1998 | Holte | 269/130 |

* cited by examiner

*Primary Examiner*—Dean J. Kramer
(74) *Attorney, Agent, or Firm*—Christie, Parker & Hale, LLP

(57) ABSTRACT

A gripper device for loosening, tightening or gripping objects. The gripper device has a support structure with a fixed, object contact surface, that preferably has a high friction surface. One end of a pivot arm is pivotally attached to the support structure. The pivot arm has a free end. A cinch strap with two ends is provided. On end of the cinch strap is attached to the free end of the pivot arm and another end of the cinch strap is fixed to the structure. By moving a jar or other cylindrical object into turning contact with the cinch strap, that object will be captured and held in place.

14 Claims, 21 Drawing Sheets

OBJECT GRIPPING DEVICE AND OPENER

CROSS-REFERENCE TO RELATED APPLICATION

This is a continuation-in-part of U.S. patent application Ser. No. 10/329,659 filed Dec. 26, 2002, now abandoned.

BACKGROUND OF THE INVENTION

This invention relates primarily to the field of kitchen utensils, in general, and in particular to devices for loosening or breaking the vacuum seal on jars or containers with threaded lids. The invention does not require any manual adjustment by the user to accommodate various sized jar lids. There are several embodiments of the invention. One embodiment is for a cabinet-mounted jar opening device. A second embodiment is for load carrying, on a much larger scale the gripper device can also be used for lifting and carry pipes or semi-round objects, e.g., with a fork lift or a crane lift. The load carrying invention can also be mounted on a robotic arm and used in all axis, which could be used in a factory, for example, to grip, lift, move, or rotate any sized semi-round parts. Another embodiment can be for a hand held jar opener, and can be used for mobile jar opening tasks. A further embodiment can be in the form of a pipe wrench, with uses including for tightening or loosening pipes or rods, such as in plumbing applications, offshore oilrigs, nuclear facilities, construction sites, and for other uses. Yet another embodiment is a bench mounted pipe vise-style device.

Prior strap wrenches are not ideally suited to open jars and grip objects of varying sizes because they generally simply include just a strap attached to one end of the tool with the length changed at the strap's other end, and adjustable by the user to accommodate different tasks. Present strap wrenches require the strap to be freed and slipped over the object to be rotated and reattached to the wrench in those situations where the wrench cannot slip over the object to be rotated. Furthermore, current strap wrench designs are not conducive to ratcheting the strap wrench effectively when working on an object for long periods of time. Current strap wrenches dictate that the user somewhat loosen the strap, rewind the wrench, and then tighten the strap again to proceed with additional wrenching.

Prior jar gripping and opening devices have elaborate jaw gripping system with teeth to grasp the lid. The drawback of using the jaws or similar methods is possible damage to the lid from the gripping teeth and a high manufacturing cost due to the intricate parts. Present designs also require the jar to be free of contaminants such as condensation, dirt, and oil. Other drawbacks for existing lid looseners are that they are often hand held, clumsy, expensive, take up valuable countertop space, and/or require the user to go through several steps to remove the jar lid.

BRIEF SUMMARY OF THE INVENTION

The invention can be used to unscrew difficult to open jar or container lids, especially those that are pressure sealed or the threads are caked over with dried sauces. Individuals lacking physical strength, as well as those who suffer from arthritis, or an injury to the hands, wrists, arms or shoulders may find it difficult, if not is impossible, to open a pressure sealed jar. Such individuals may further risk injury to their wrists or body while exerting force to open a jar or container. Also, during opening the jar may also slip off the counter top, and if a glass jar, can shatter and risk injuring someone else. The invention is adapted to accept jars or container lids of various sizes and requires no conscience adjustment by the user to do so.

The invention consists of a fixed portion and a pivoting arm used to grip any size jar lid. A cinching strap is positioned between the two points just mentioned. The pivoting arm is positioned so that a rotating force will create a tight, self-adjusting grip on the jar lid by the use of the cinching strap. The torque exerted on the lid is a function of the cinching strap's friction and the amount of rotating force provided by the user. As the jar is rotated by the user, the torque applied to the lid equals the rotational force provided (assuming no slippage between lid and cinch strap). The inventor's designs will enable the user to use both hands to hold and rotate the jar, while the lid is securely gripped by the device.

The gripping device may be mounted to the underside of a cabinet, a vertical edge of a counter or closet wall, a drawer or any fixed surface. The gripping device will operate in any orientation the user desires, such as vertically or horizontally. Although horizontal is best to eliminate spillage of juice or sauce from the opened jar. The gripping device can swing from a stowed position to a vertical or horizontal position with the use of a hinge.

A hand held embodiment is also provided. This embodiment particularly is practical for mobile and outdoor applications or traveling in a motor home. The hand held embodiment requires one hand to hold the jar and the other to hold and rotate the tool.

An embodiment of the gripping system can be used for load carrying. Robots in factories, production lines, oil rigs, biological facilities, or nuclear facilities, etc., can either loosen or tighten pipes, transport and lift pipes, test tubes, or rods. Such a gripping system comprises two sets of pivot arm gripper devices spaced apart to hold the object. Between the two gripper devices is located a powered drive wheel that can rotate the object to be bound to a secured position. This arrangement can be mounted on a tractor, forklift, robotic arm, or a lifting crane.

Another embodiment of the gripping pivot arm device can be incorporated into pivot arm pipe wrench. This embodiment can operate on different sized pipes by simply adjusting the strap length. The pipe wrench embodiment does not require dismantling a strap prior to use on a pipe, unlike current strap wrenches. Instead, the user can just insert the pipe, pull the strap tight, and rotate the invented pipe wrench. Also, the pivot arm strap wrench will allow the user to ratchet while tightening or loosening. The pivot arm pipe wrench embodiment can be simply flipped over to either tighten or loosen objects. Initial toque tests indicate that this embodiment has a 5-fold advantage in the amount of torque applied over current strap wrenches.

A further embodiment of the invention is a bench or truck mounted pipe vise. An advantage of this embodiment is that the pipe is secured over a larger surface area. Conventional vises pinch the pipe only on two sides, thus the small insufficient contact area with the vise can sometimes allow the pipe to slip in the vise.

DETAILED DESCRIPTION OF THE INVENTION

The purpose of the gripping device invention is to grasp objects through the use of a pivoting arm, a cinching strap and a fixed ridge. One advantage of the gripper device is the use of a pivoting arm to take up the slack in the cinching strap when grasping an object. The first embodiment of the gripper device can be used to loosen container and jar lids. The gripper device can be secured under a cabinet, or in a pantry. The gripper device can be hinged to allow an angle more suitable to the user. The gripper device's strap will grasp a jar's lid without conscious user adjustment, and allows both of the user's hands to rotate the jar for loosening, thusly increasing the amount of torque the user can apply to loosening the jar lid. Other embodiments of the gripper device include a transporting device, a hand held jar opener, hand held wrenches, and a bench vice.

Figure 1:
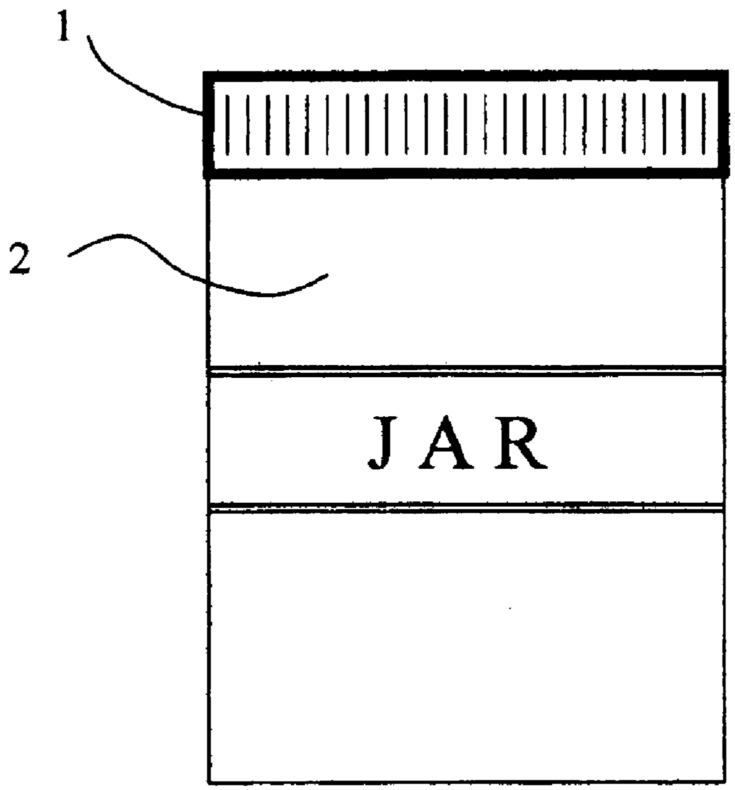
FIG. 1 is a side view of an exemplary jar with its affixed lid.
Figure 2:
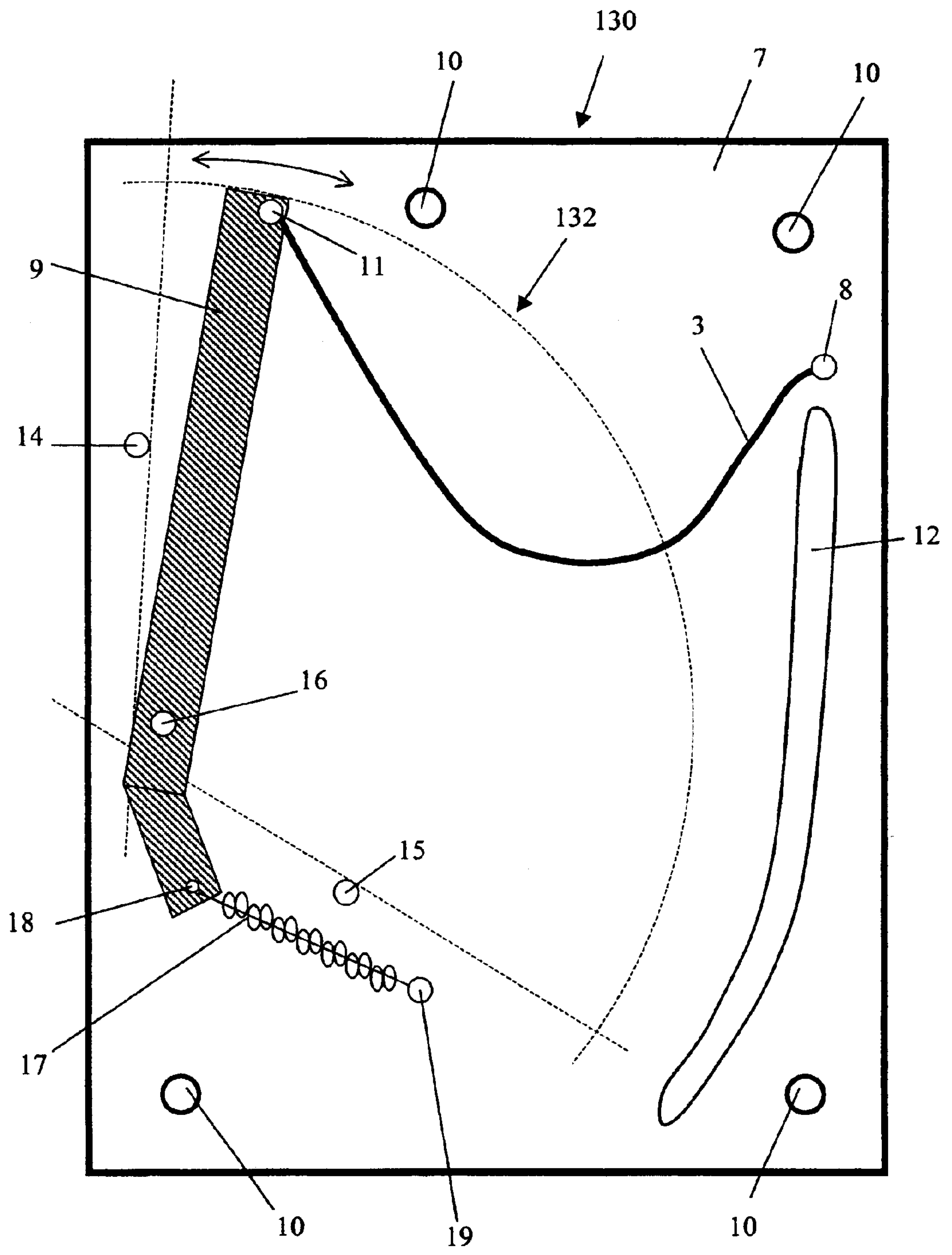
FIG. 2 is a top view of an exemplary embodiment of a gripper device of the invention having a pivot arm.

FIG. 2 is a bottom plan view of the gripper device 130 of the invention. Gripper device 130 has a cinching strap 3 mounted at end to a post 8 secured to a support structure or base plate 7. The gripper device 130 can be securely mounted on any surface (such as to the underside of a kitchen cabinet or to the side of a structure), in any axis by means, for example by mounting holes 10 in the base plate 7, although other means can be used. The other end 11 of the cinching strap 3 is attached to a pivoting arm 9, which is free to swivel about a pivot 16. Another method of mounting the cinching strap 3 in lieu of utilizing a post 8 is to mount the cinching strap 3 onto the top of a fixed ridge 12 (or fixed object contact surface). The fixed ridge 12 is attached to the baseplate 7 and can extend from it at about a 90-degree angle. The fixed ridge 12 can either be welded, bolted, or if plastic can be integrated with the base plate 7. The fixed ridge 12 preferably generally follows the arc 132 (shown in dashed lines) of the pivoting arm 9. The fixed ridge's 12 height is preferably roughly equal to the width of the cinching strap 3, which can be set to be roughly equal to the width of an average jar lid 1. The width of the strap should roughly equal the average width of jar lids. Unless the invention is manufactured to grip the base of jar, as opposed to their lids, which would require a wider strap 3. The material of the cinch strap 3 is selected so that it has enough tensile strength and friction. The pivoting arm's 9 travel is preferably limited by an upper stop 14 and a lower stop 15. The purpose of the upper stop 14 is to allow some slack in the strap 3 so it can accept the jar lid 1. The pivoting arm 9 pivots around the attachment point 16, which can be designed with a bearing or bushing to improve longevity and smoothness of operation. A spring 17 or similar method of applying tension is attached to an end of the pivot arm 18, opposite attachment point 11, and at a point 19 located on the base plate 7. The purpose of the spring 17 is to return the pivot arm 9 to the open position (as shown) to allow it to accept a new jar's lid 1 to be opened. The base plate 7 not only holds all the pieces together, but also ensures alignment of the cinch strap 3 with the lid 1 and the fixed ridge 12.

Figure 3:
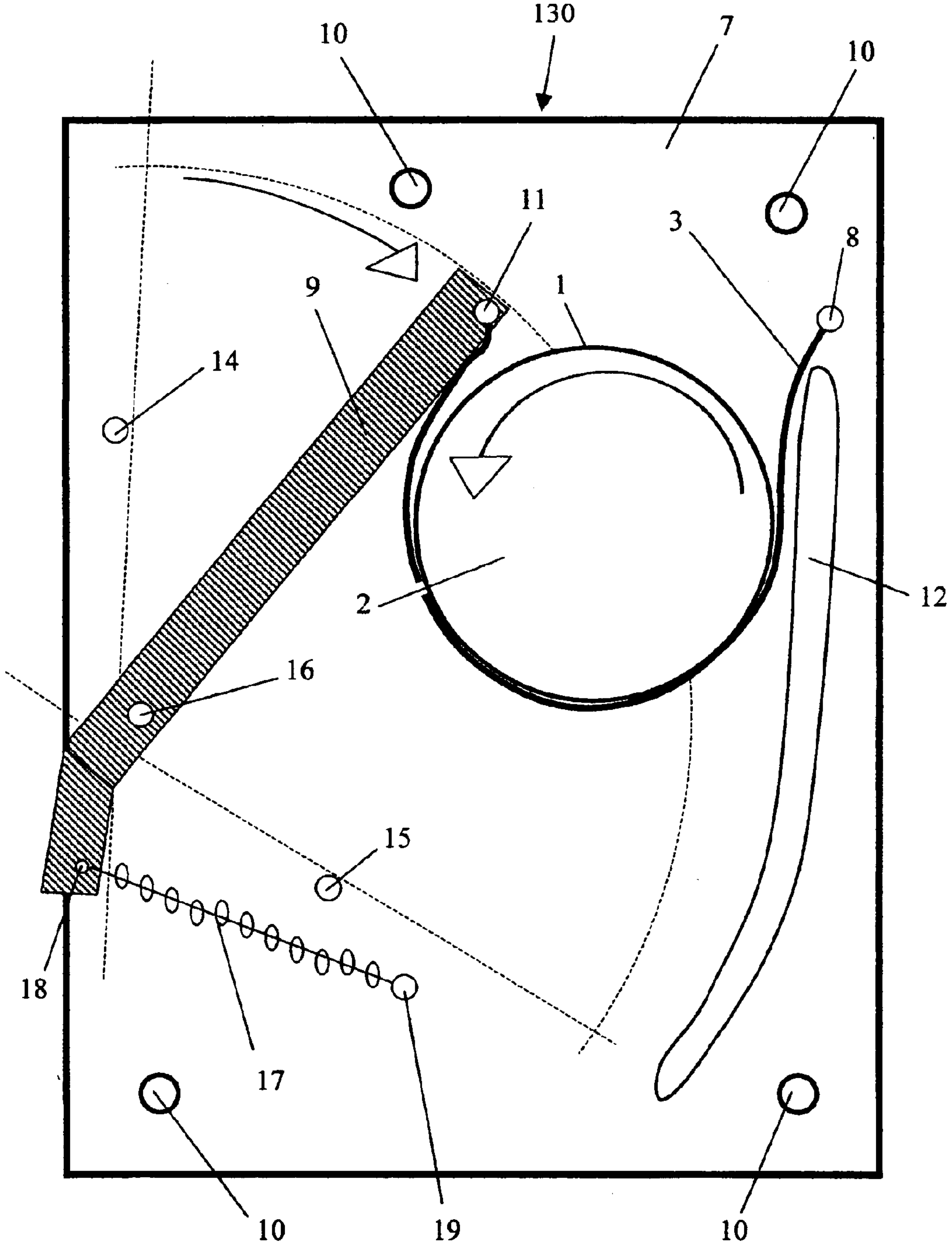
FIG. 3 is a top view of the gripper device of FIG. 2 accepting a large jar for loosening of its lid.

FIG. 3 is a top plan view of the gripper device 130 of FIG. 2 used to open a large diameter lid 1 with no adjustment by the user. To use the gripper device, a user places a jar 2 with its lid 1 face down on base plate 7, and pushes the lid into contact with cinch strap 3. This causes the lid 1 to roll down counter-clockwise until the cinching strap 3 is taut, which in turn causes the pivoting arm 9 to swing down to take up the slack of the cinching strap 3. By continuing to turn the jar 2 counterclockwise, the lid 1 will soon loosen.

Figure 4:
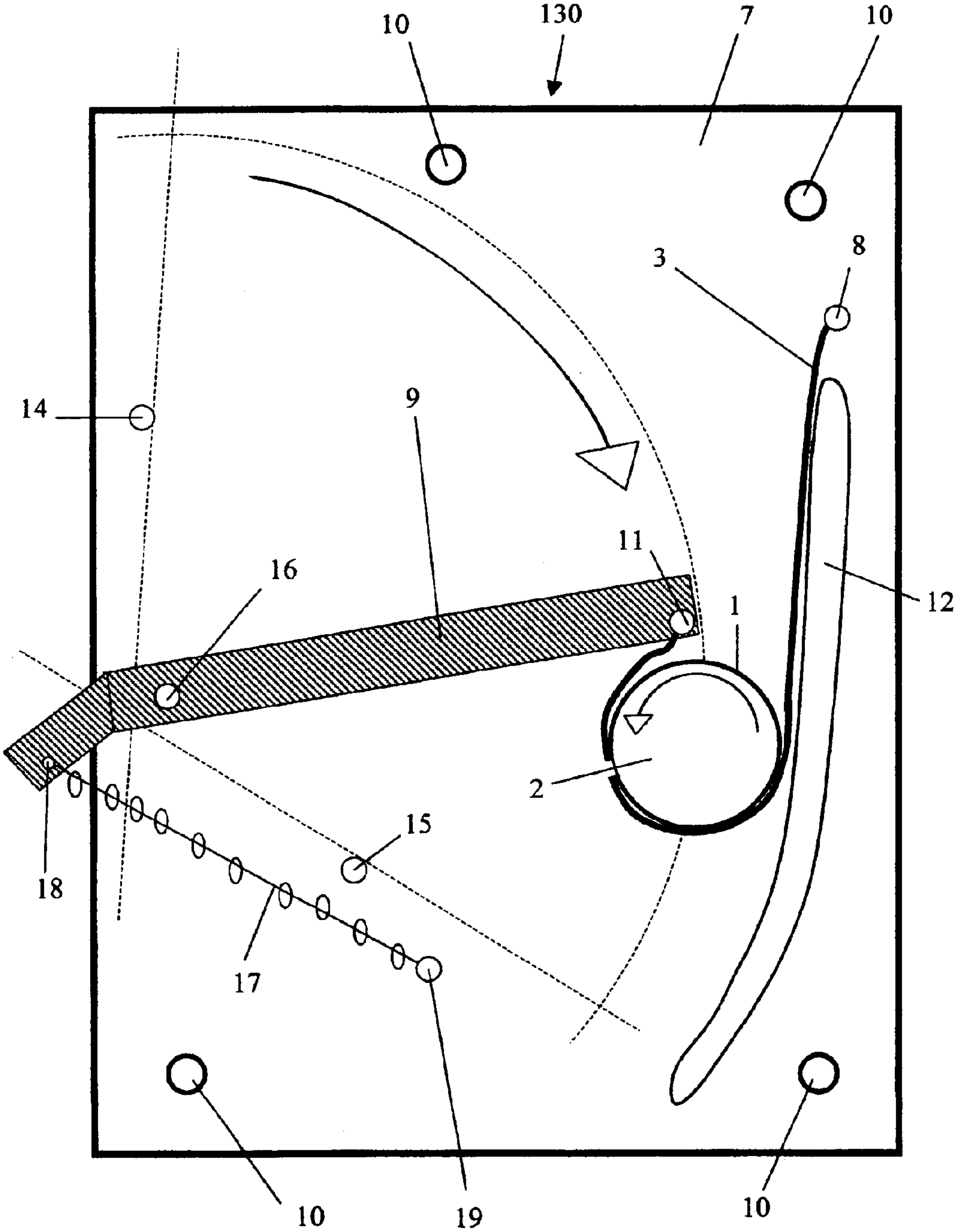
FIG. 4 is a top view of the gripper device of FIG. 2 accepting a small jar for loosening of its lid.

FIG. 4 is a top plan view of the gripper device 130 of FIG. 2 used to open a smaller diameter lid 1 with no adjustment by the user. The lid 1 rolls down the fixed ridge 12 counter-clockwise until the cinching strap 3 is taut and grips the lid 1. Other features and operations of the device 130 are as shown as in FIG. 2.

Figure 5:
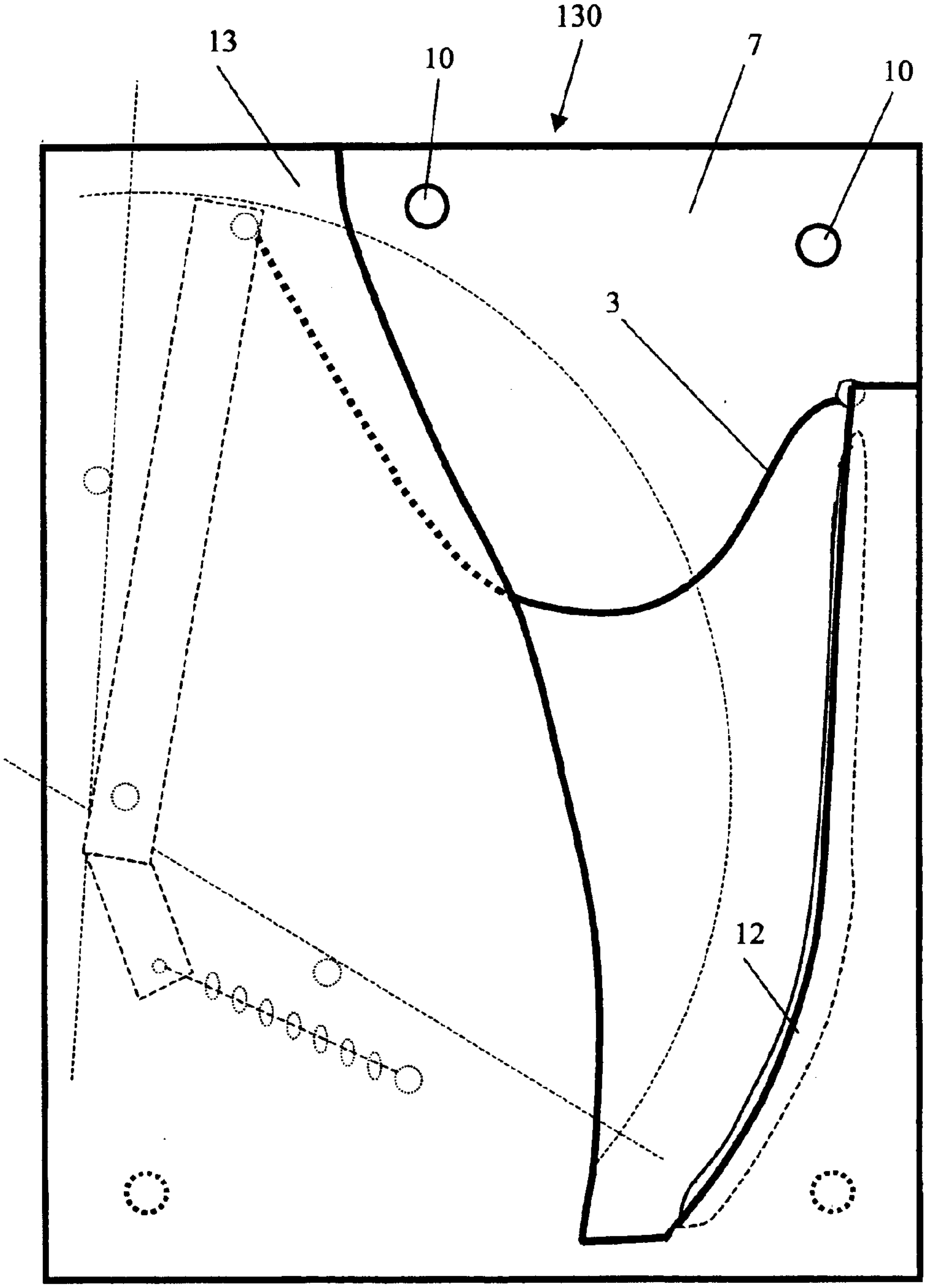
FIG. 5 is a top view of the gripper device of FIG. 2 with an aesthetic/safety cover plate.

FIG. 5 is a top plan view of the gripper device 130 of FIG. 2, but equipped with a cover plate 13 is to improve the appearance and safety, and to keep the user's fingers out of the pivot arm's 9 travel. A secondary function of the cover plate 13 is the strap 3 is not allowed to be pulled downward by gravity when gripper device 130 is mounted under a cabinet 20.

Figure 6:
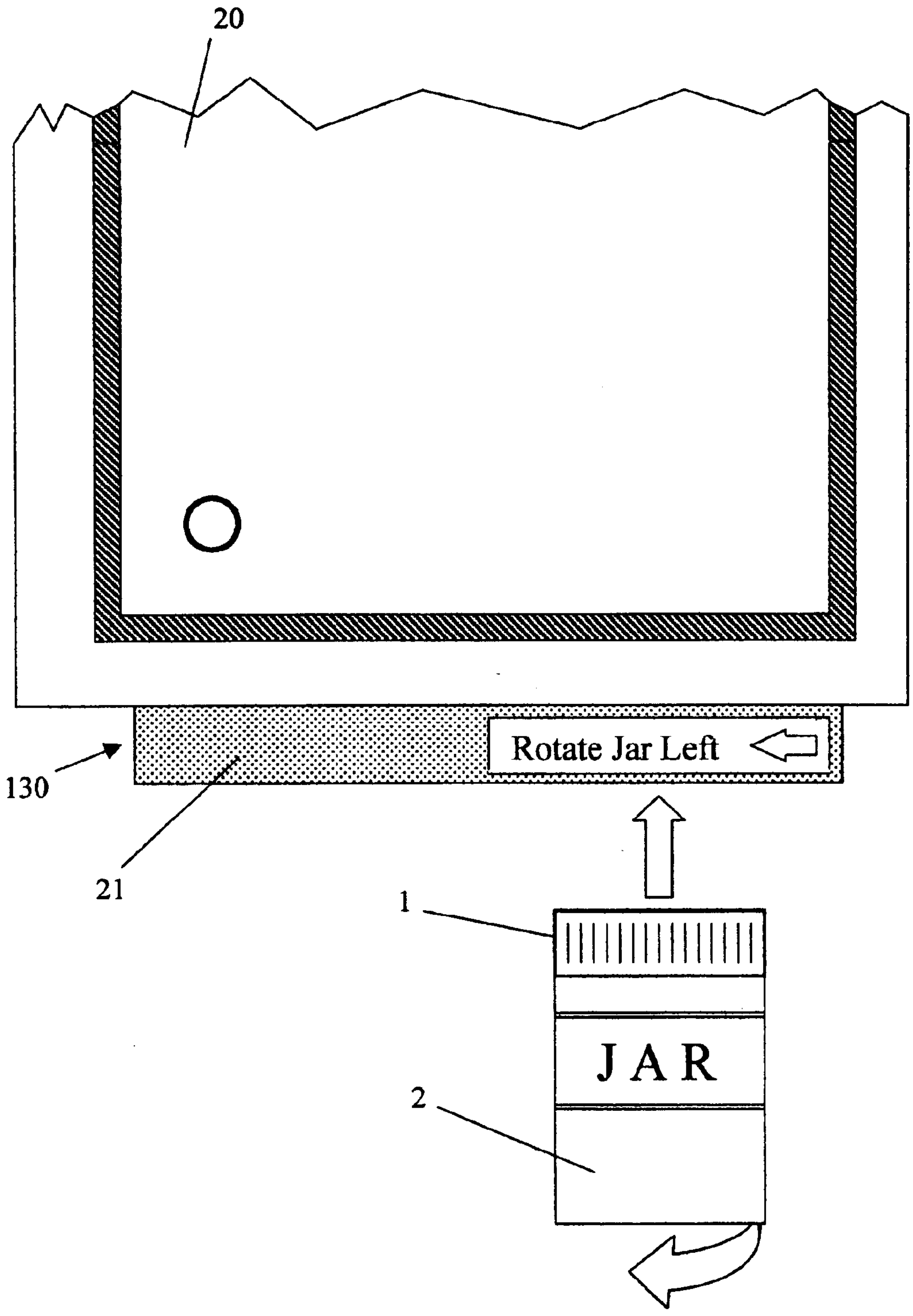
FIG. 6 is a front view of the gripper device of FIG. 2 mounted under a cabinet.

FIG. 6 is a front view showing the gripper device 130 of FIG. 2 mounted under a kitchen cabinet 20 for easy access. However, as noted above, the device 130 can be mounted on any axis, say on a closet wall. The materials for the invention can be of any rigid material such as plastic, steel, or aluminum. The invention can optionally be hinged on the edge of the cabinet facing the user. Such a hinge will permit the far edge of the gripper device 130 to swing down a predetermined angle (e.g. about 20 degrees) for easier viewing and use. In this example, the jar 2 would be inserted vertically into the invention till the lid 1 contacts with the base plate 7. If a small diameter jar 2 is inserted, the jar 2 may have to slide along the fixed ridge 12 till the lid 1 makes contact with the cinch strap 3 and then the jar 2 can be rotated to the user's left (jar's 2 counter-clockwise). This rotation will cause the lid 1 to bind with cinching strap 3, pulling the pivot arm 9 toward the lid 1 all while forcing the lid 1 to contact the fixed ridge 12. Once the jar 2 rolls down into a taut cinch strap 3, additional rotational force is applied to the jar 2 to loosen the lid 1. Once the jar's 2 pressure seal is broken, the user simply rotates the jar 2 slightly to the right (jar's 2 clockwise) to free it and lowers the jar 2 from the gripper device 130. The spring 17 will return the pivot arm 9 to the open position to accept the next lid 1. The gripper device's side 21 facing the user can be used to display instructions for use.

Figure 7:
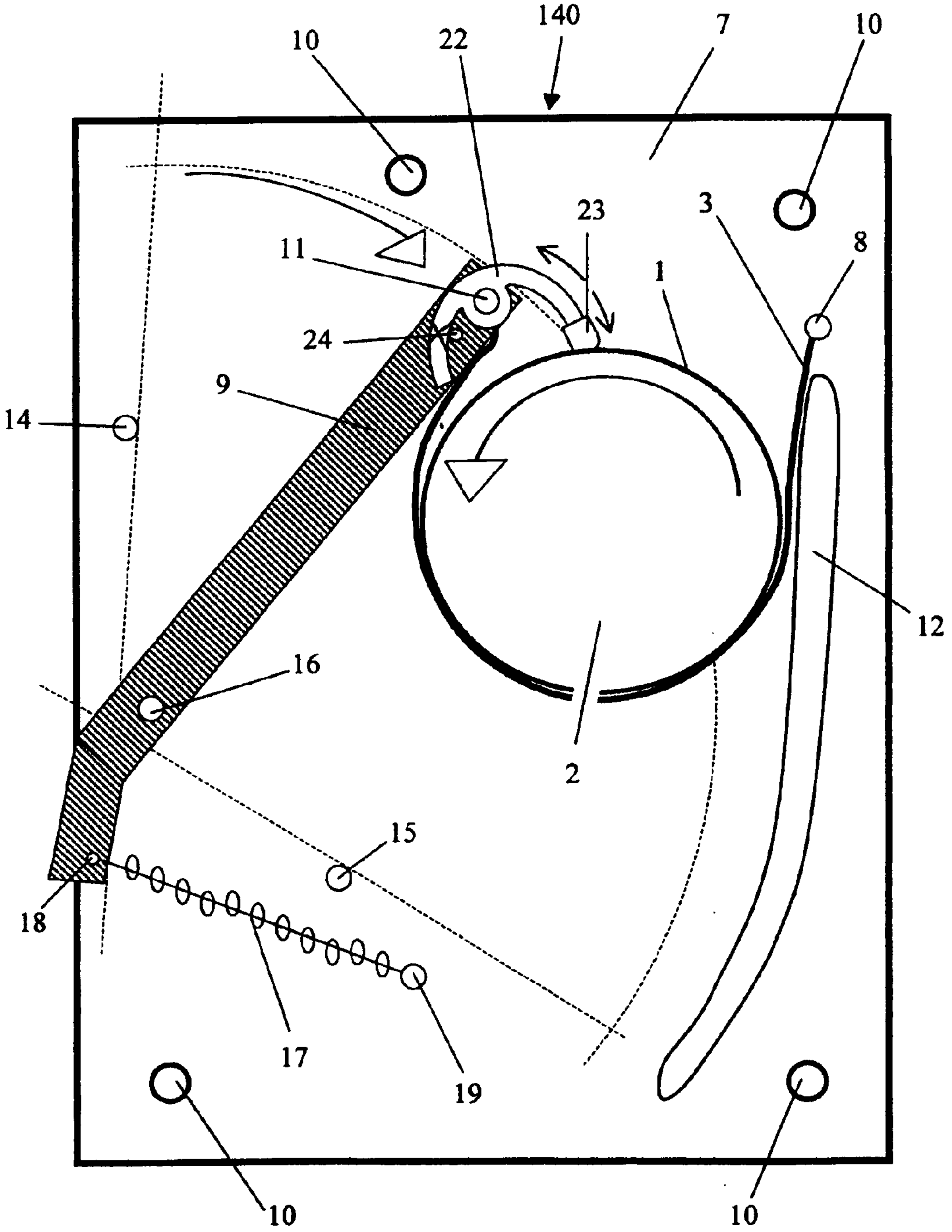
FIG. 7 is a top view of the gripper device of FIG. 2 modified to include a rocker arm at the tip of the pivot arm and accepting a large jar.
Figure 8:
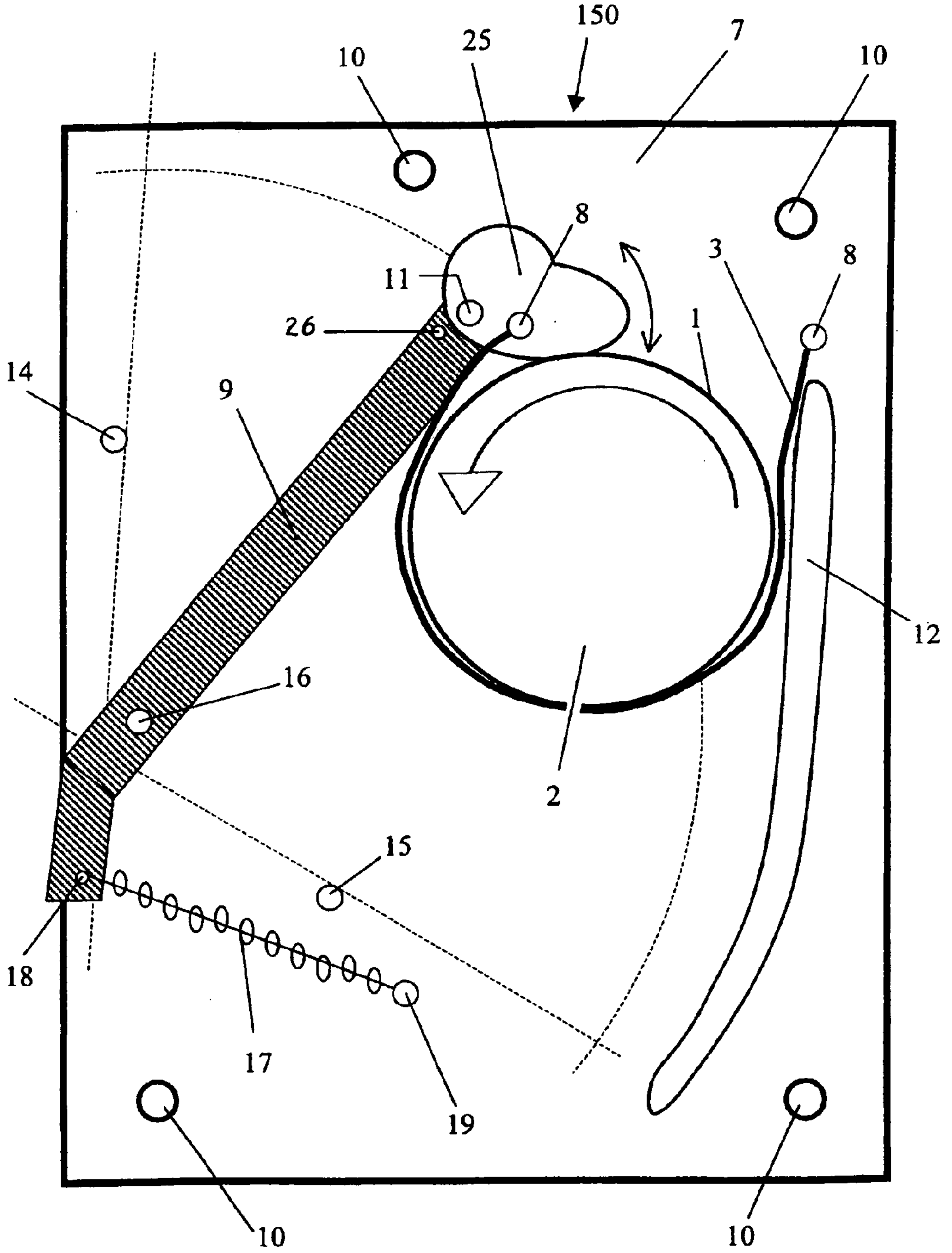
FIG. 8 is a top view of the gripper device of FIG. 2 utilizing a cam at the tip of the pivot arm and accepting a large jar.

FIGS. 7 and 8, show two modifications of the embodiment of the invention 140 & 150 of FIG. 2 having additional devices mounted to the end of the pivot arm 9. These devices are designed to exert a force directly onto the lid 1 as the cinching strap 3 pulls the pivot arm 9 down. The embodiment of FIG. 7 has a rocker arm 22 at the end of pivot arm 9. The rocker arm 22 can apply additional force on the lid 1. A rocker arm end 23 makes contact with the lid 1 and should be of a longer length than a trailing end 24 to follow the curve of the lid 1. This rocker arm end 23 contacting the lid 1 is further forced downward by the opposite arm being forced upward from contacting the cinching strap 3. The tip of rocker arm end 23 in contact with the lid 1 may be tipped with something for added friction, such as rubber or a gripping tooth.

FIG. 8 shows a cam 25 fitted to end of pivot arm 9. Cain 25 can be used to increase the force on the lid 1 during rotation. The cam's 25 surface facing the lid 1 may be a non-slip surface. The cinching strap 3 is mounted 8 on the cam 25 offset from the pivoting point 11. This will force the cinching strap 3 to bind tighter as the cam 25 contacts the counter-clockwise rotating lid 1 and the cam rotates clockwise. The rocker arm and cam can optionally be spring loaded to an open position of the stop 26.

Figure 9:
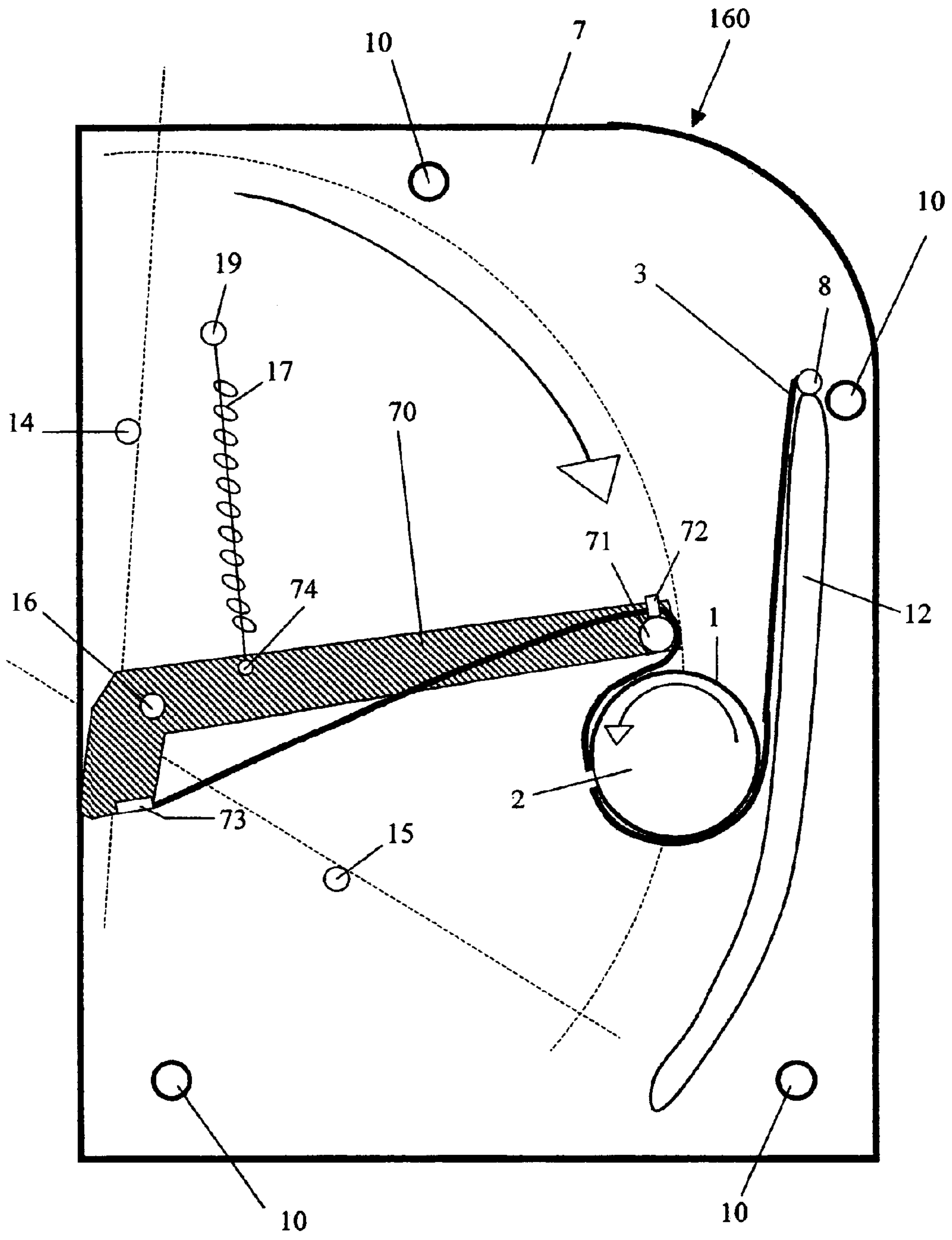
FIG. 9 is a top view of the gripper device of FIG. 2 utilizing a different type of pivot arm to increase strap tension around the gripped object.

FIG. 9 shows another design of the gripper device 160 that increases the amount of strap 3 tension around the jar lid 1. The strap 3 is routed over a roller bearing 71 at the end of the pivot arm 70 and secured at the point 73. The mount 73 is positioned on the bottom of the pivot arm 70, causing the swing arm to have an upward exertion, away from the cinched lid 1, increasing the amount of strap 3 tension around the jar lid 1. This pivot arm 70 design can be applied to any of the other embodiments in this patent and it's proportions can be changed to increase the amount of strap 3 tension. Also shown in this figure is a relocated spring 17 to spring mount 74. This spring location can reduce the size of the device by not requiring spring mounting point 18 as seen in previous figures.

Figure 10:
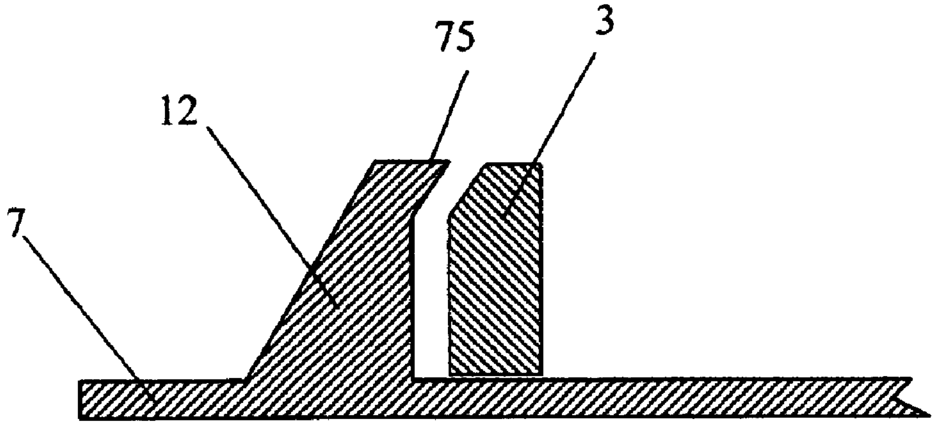
FIG. 10 is a side view of the fixed ridge and strap.

FIG. 10 shows the beveled edge 75 at top of the fixed ridge 12. The strap 3 fits into this beveled shape 75 as the lid 1 is inserted into the gripper device 130. This beveled shape 75 helps to combat gravity and keep the strap 3 close to the base plate 7 when the lid 1 is inserted. A secondary function of the beveled shape 75 is to wedge the strap into the fixed ridge 12 as the lid 1 compresses the strap 3.

Figure 11:
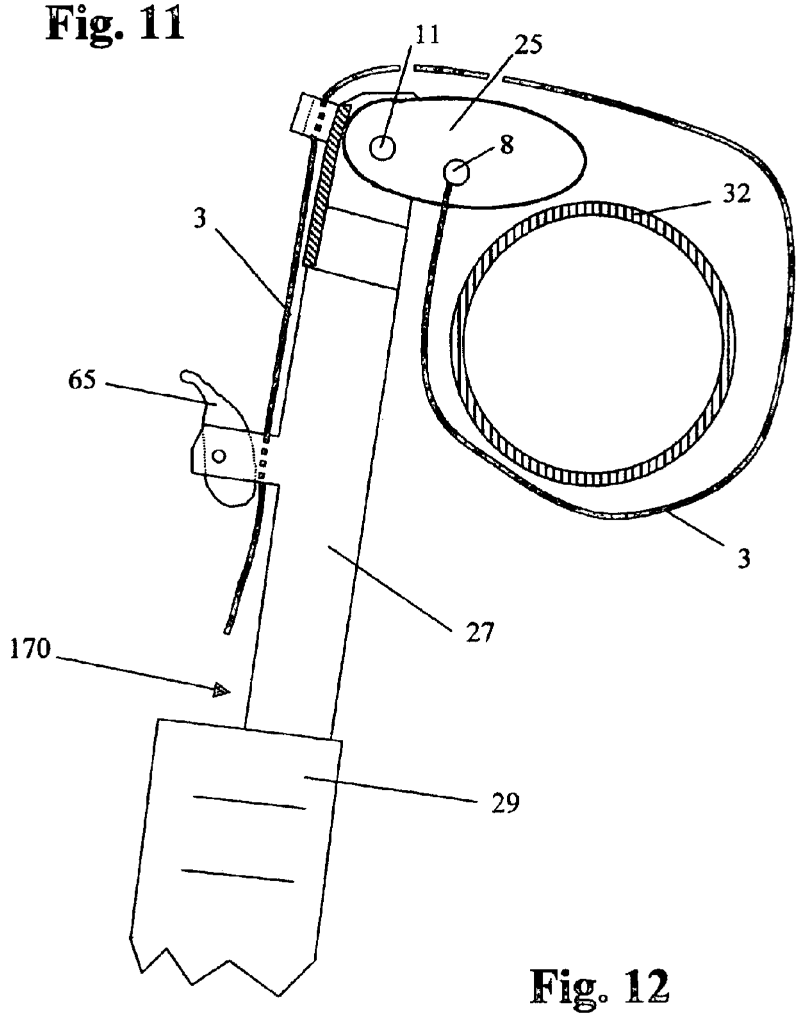
FIG. 11 is a top view of another embodiment of a gripper device of the invention in the form of a hand held tool utilizing a cam.
Figure 12:
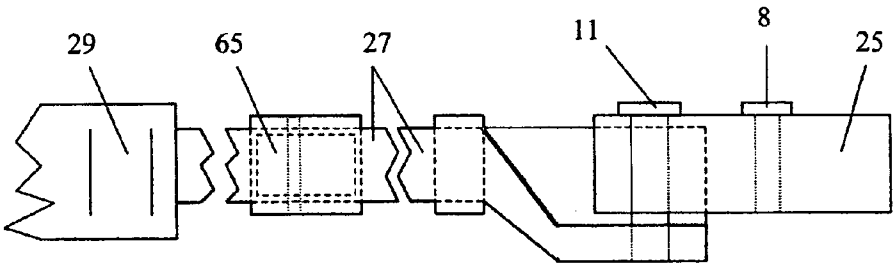
FIG. 12 is a side view of the gripper device of FIG. 11.

FIGS. 11 and 12 shows another embodiment of gripper device in the form of a hand held wrench tool 170. These figures illustrate the use of a cam 25 (as used in the embodiment of FIG. 8), to increase the mechanical advantage. These tools can be used for loosening or tightening any shape and virtually any sized object, limited only by the length of the cinching strap 3. The cinching strap 3 can be secured in place on the shank 27 by a cam shape mounted in the shank 27. The cinch strap's 3 slack can be pulled by the user to tighten the cinching strap 3 around the object to be rotated. Once the cinching strap 3 reverses pull when the wrench is rotated by the user, the cam 65 engages and locks the cinching strap 3 to the shank 27. The shank 27 can be made at any length, depending on the amount of torque required for different jobs. The cinching strap 3 can be longer to match the proportion of the shank's 27 length. A handle 29 to which the shank 27 is attached can be ergonomically designed for the user's comfort. The handle 29 can be integral with shank 27 if desired.

Figure 13:
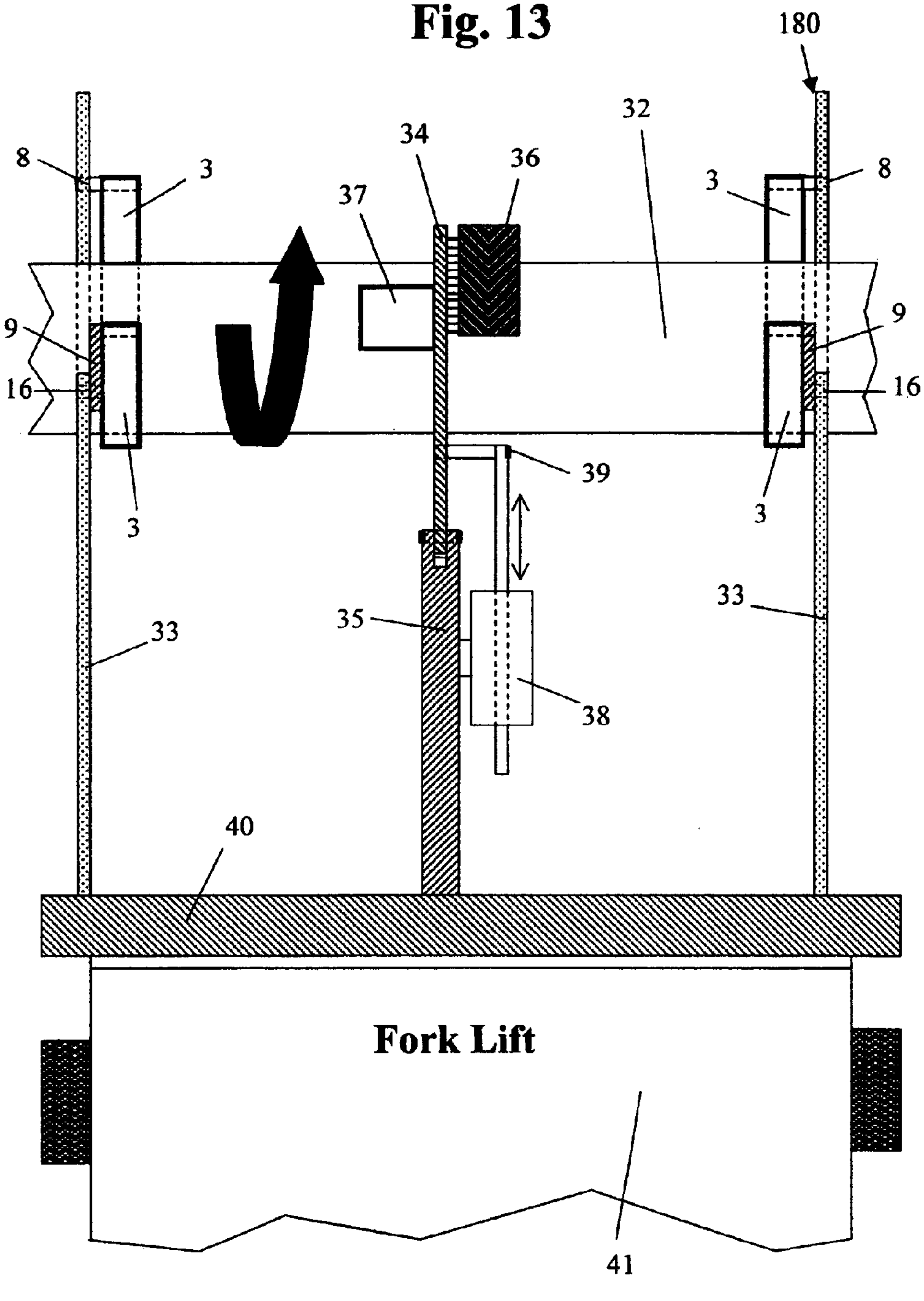
FIG. 13 is a top view of two gripper devices utilizing pivot arms and then mounted to a forklift.

FIG. 13 shows the gripper device 180 designed to accommodate a pipe 32 or bundle of pipes or objects for transport or rotation. FIG. 13 shows two gripper devices 33, separated by some distance appropriate for the size of load to be carried. The two cinch straps 3 can securely hold a pipe 32, e.g., in a level plane. Placed somewhere between the two gripper devices 33 is an articulating arm 34 with a drive belt 36 system. This articulating arm 34 can be hydraulically 38 powered for extension and retraction. An electric motor driving a jack screw can suffice for extension and retraction of the articulating arm 34. The dashed outlined articulating arm 34 shows the device in the open position to accept a pipe 32. The articulating arm's 34 primary purpose is to serve as a means to mount the drive belt 36. The articulating arm's 34 secondary purpose is pull the pipe 32 inwards toward the cinching straps 3, once contact is made with the drive belt 36. The drive belt's 36 purpose is to rotate the pipe 32 counter-clockwise (in this case), to engage and bind the pipe 32 with the cinching straps 3. The drive belt 36 can be rotated with an electric motor 37 and series of gears. Once the pipe 32 is bound in place, the articulating arm 34 can assist in holding the pipe 32 in the cinching straps 3. The articulating arm 34 is mounted to a fixed arm 35, which is then mounted to a back plate 40. The two gripper devices 33 are also mounted to the backplate 40. The back plate 40 can be mounted to a forklift 41, tractor, lifting crane, and robotic arm. The benefit of this arrangement is safer movement and transport of pipe 32, etc. This arrangement will not scour or damage the pipe 32 being gripped if a soft strap is used. Other applications could include the delicate handling of glass test tubes or nuclear rods.

Figure 14:
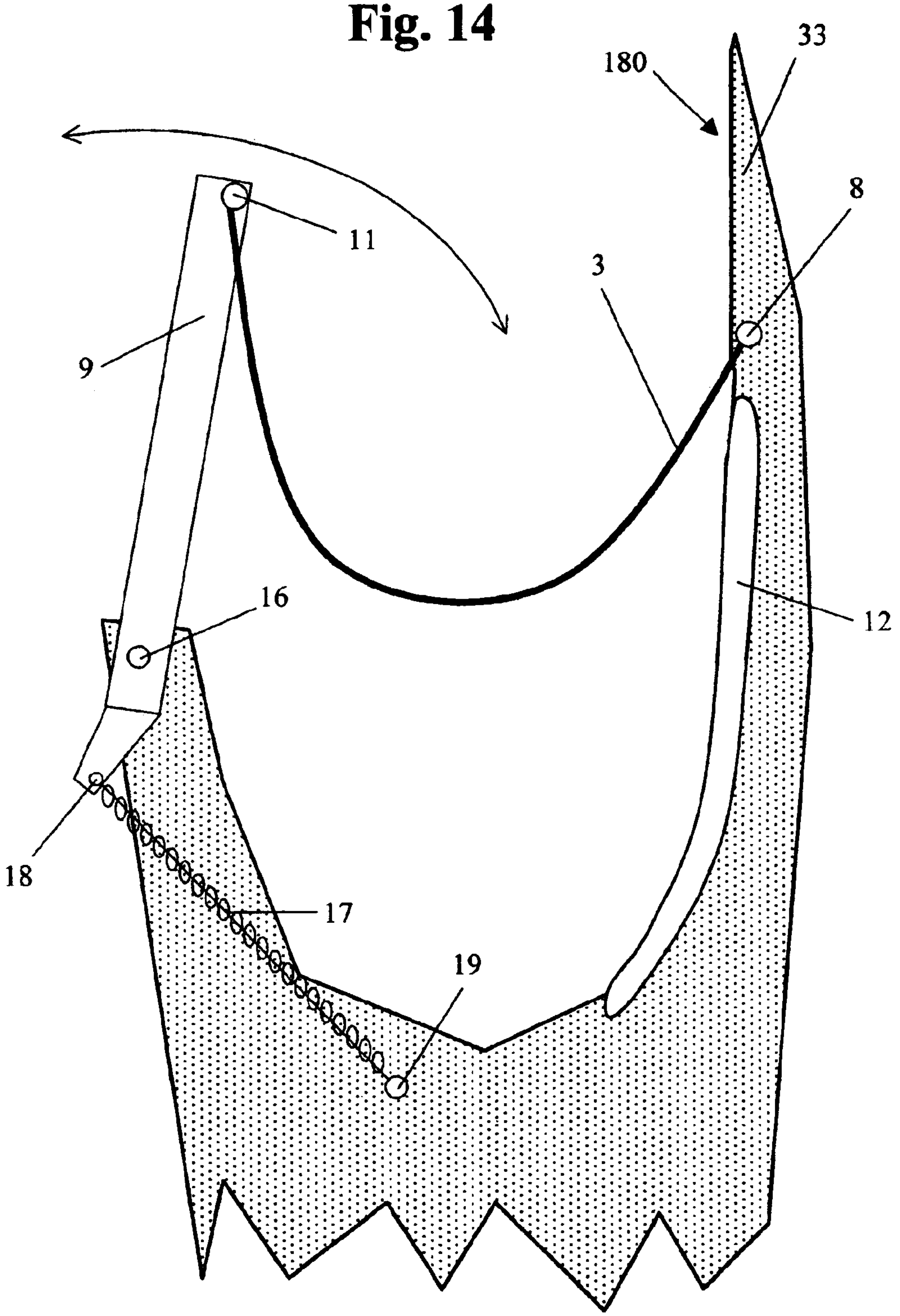
FIG. 14 is a side view of a gripper device of FIG. 12 for mounting on various transporting devices.

FIG. 14 shows a side view of the gripper device 180 as used in FIG. 13 that is slightly different in design to accept pipe, etc. (not shown). This plate 33 does not need a backplate 7 (e.g., to limit the insertion of the jar lid 1 ), as is the case with the earlier described gripper devices designed to loosen lids 1. The plate 33 is to be mounted to the back plate 40.

Figure 15:
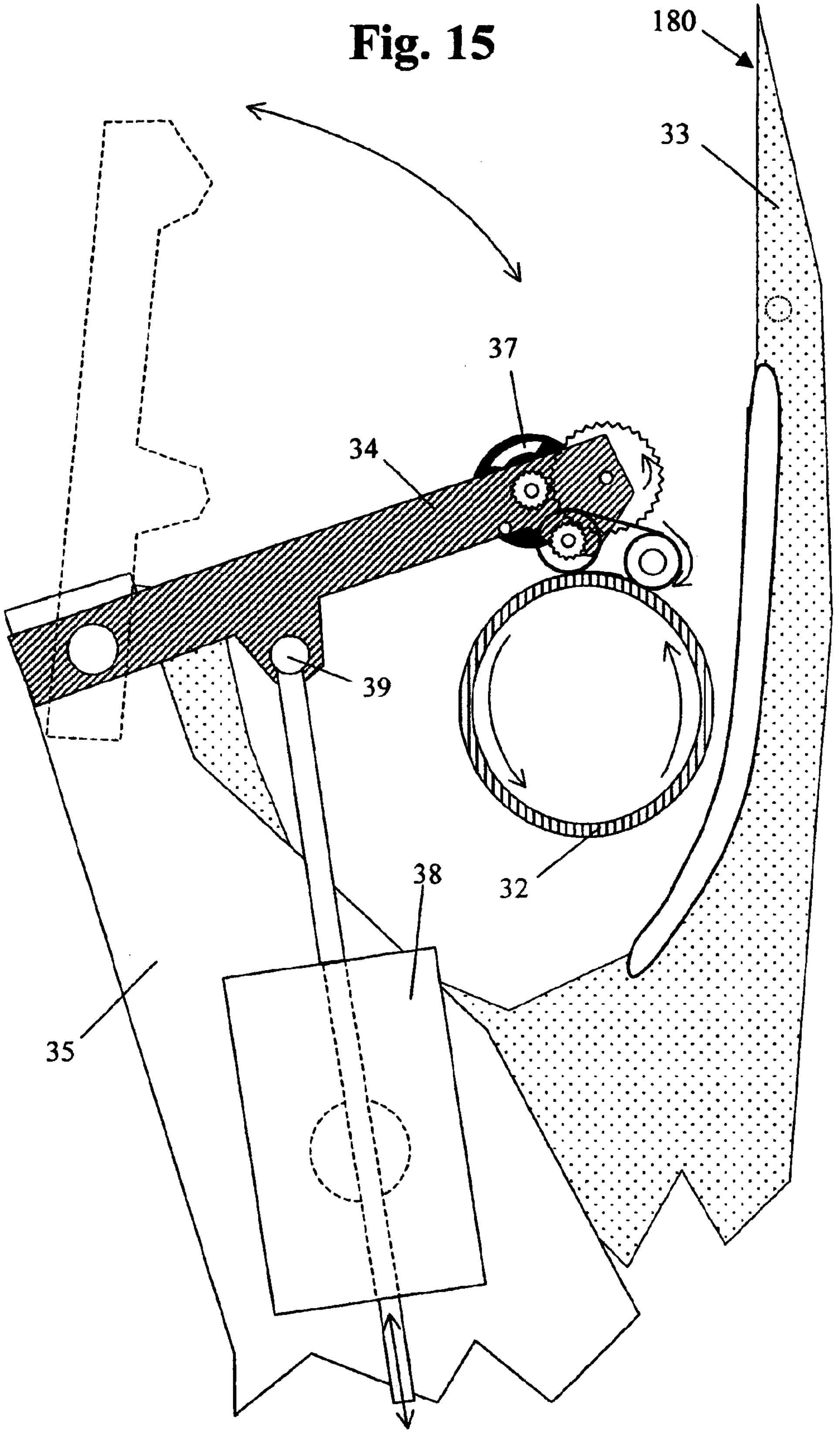
FIG. 15 is a side view of an articulating arm with a drive belt for rotating an object and used with gripper devices of FIG. 12.
Figure 16:
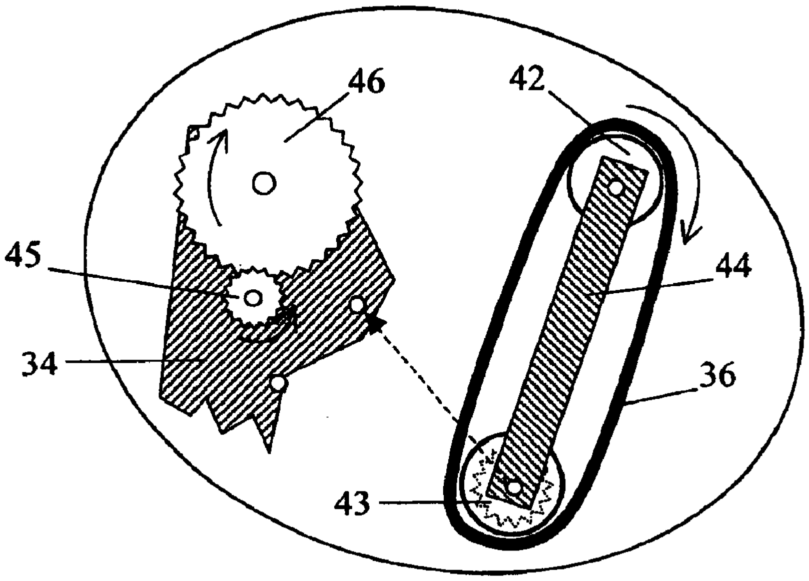
FIG. 16 is an expanded side view of the drive belt gears ofFIG. 15.

FIG. 15 is a schematic view showing the articulating arm 34 and the drive belt 36 capturing and rotating a pipe 32 in a counter-clockwise direction. The outline of the pivot arm mounting plate 33 is shown behind the articulating arm 34. The drive belt 36 is rotated through a series of gears 43, 45, and 46, as best shown in FIG. 16. The electric motor 37 is mounted to the articulating arm 34. The electric motor 37 is connected to and rotates the pinion gear 45. The spur gear 46 has a bearing 47 and is mounted to the articulating arm 34. The drive gear 43 for the belt 36 is attached to a splined inner barrel 53 by the means of a setscrew. The fixed arm 35 is mounted to the back plate 40.

FIG. 16 the drive gears 46, 45 and drive belt 36 are separated for clarification. The pinion gear 45 is driven by the motor, which in turn rotates spur gear 46. The spur gear 46 drives the drive belt gear 43, which in turn rotates the drive belt 36.

Figure 17:
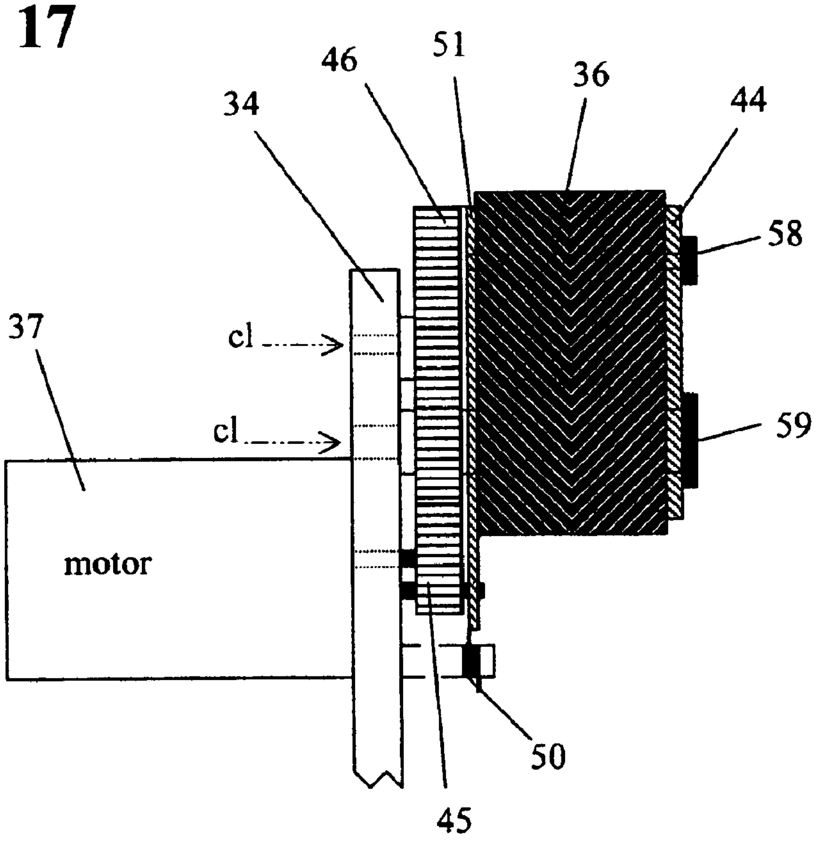
FIG. 17 is a top view of the drive belt device of FIG. 15.

FIG. 17 shows the assembled drive belt 36. Note the small gap between the spur gear 46 and the inner separator plate 51, allowing for free swivel of the drive belt 36 assembly.

Figure 18:
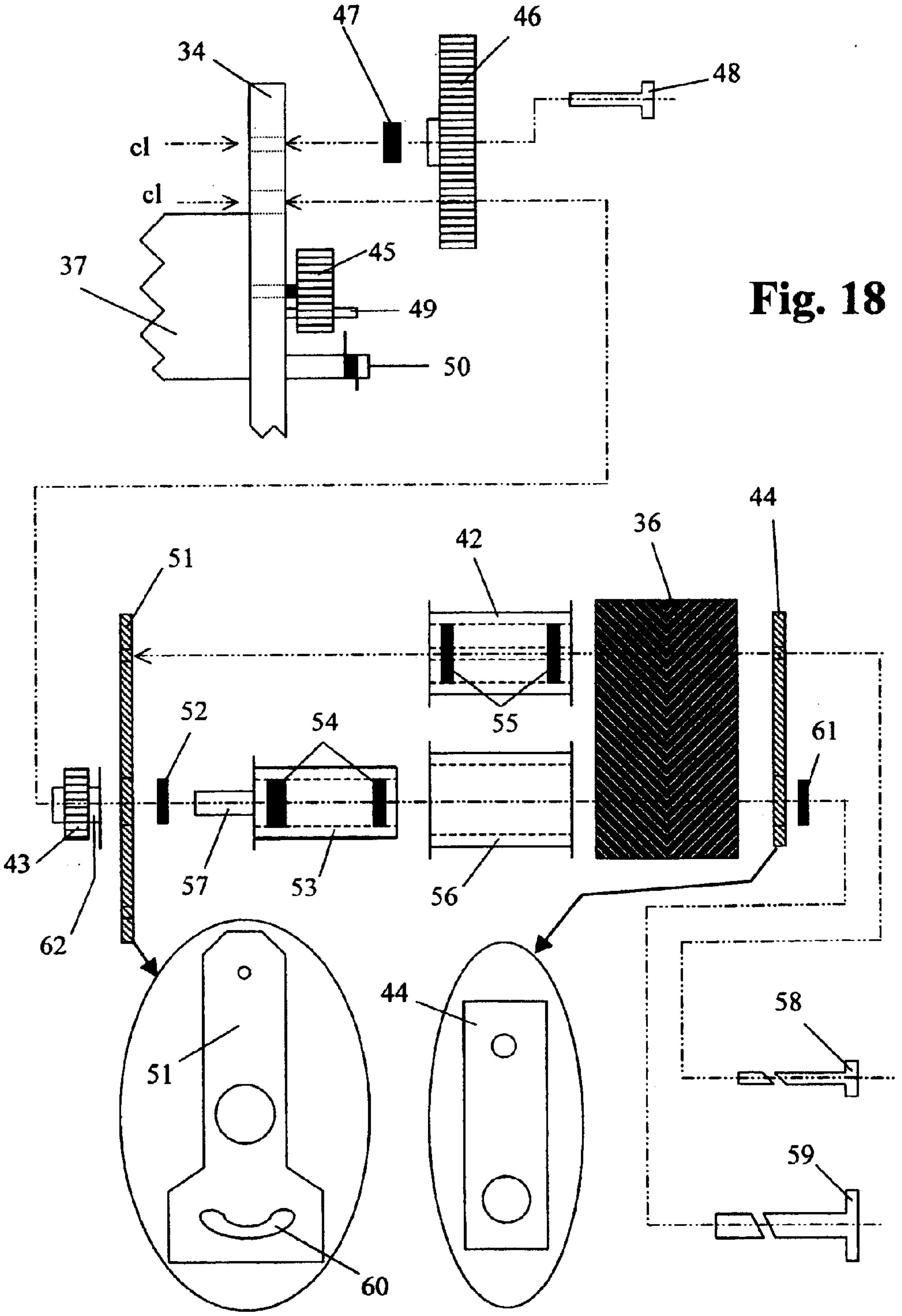
FIG. 18 is a top view of the expanded drive belt device of FIG. 15.

FIG. 18 shows an expanded top view illustrating how the drive belt 36 is assembled. The articulating arm 34 is shown in a vertical position with the motor 37 and pinion gear 45 mounted thereto. Mounted to the articulating arm 34 is a drive belt travel limit post 49 and a drive belt return spring 50. The drive belt travel limit post 49 fits in a slot 60 on an inner separator plate 51. The drive belt travel limit post 49 limits the upward and downward motion of the drive belt 36 assembly. The drive belt 36 assembly needs to swivel to accommodate various sizes of pipes 32. The drive belt return spring 50 repositions the drive belt 36 assembly to an upward position to accept pipe 32. The drive gear 43 slips onto a small diameter portion 57 of an inner drive barrel 53 and is secured with a set screw or similar method. The long length of the small diameter portion 57 of the inner drive barrel 53 acts as a spacer to separate the drive gear 43 away from the articulating arm 34. The drive belt gear 43 holds an inner separator plate 51 and a bearing 52 flush against the inner drive barrel 53. The small flange 62 between the drive belt gear 43 and the inner separator plate 51 is the distance required to separate a spur gear 46 and the inner separator plate 51. A bearing 52 will allow the inner drive barrel 53 to spin freely over a mounting bolt 59. The outer drive barrel 56 slips over the inner drive barrel 53, and has a splined surface between two drive barrels 53 and also 56 to transfer the rotation created by the drive belt gear 43. The rotation of the outer drive barrel 56 causes the drive belt 36 to rotate. An idler barrel 42 is free spinning assisted by bearings 55 and rides on a mounting bolt 58. The mounting bolt. 58 threads into the inner separator plate 51, and should not flex as to keep the barrels 42 and 56 parallel and the drive belt 36 stretched taunt. The drive belt 36 is made from rubber or metal links and its outer surface is textured or has teeth to induce traction to the pipe 32. The drive belt 36 is slipped over the outer drive barrel 56 and the idler barrel 42 and then stretched so the barrels can be mounted in place. An outer separator plate 44 holds the barrels 42 and 46 parallel and is guide for the mounting bolts 58 and 59. A bearing 61 allows for swivel of the drive belt 36 assembly around the mounting bolt 59 without causing excessive wear. Mounting bolt 59 threads into the articulating arm 34. By the clockwise direction of the drive belt 36 coming in contact with the pipe 32, the resultant force will pull the idler barrel 42 end of the drive belt 36 assembly toward the pipe 32, increasing friction on the pipe 32. The drive belt travel limiter post 49 will not allow the drive belt 36 assembly to rotate beyond a preset number of degrees if there is no contact made with the pipe 32.

Figure 19:
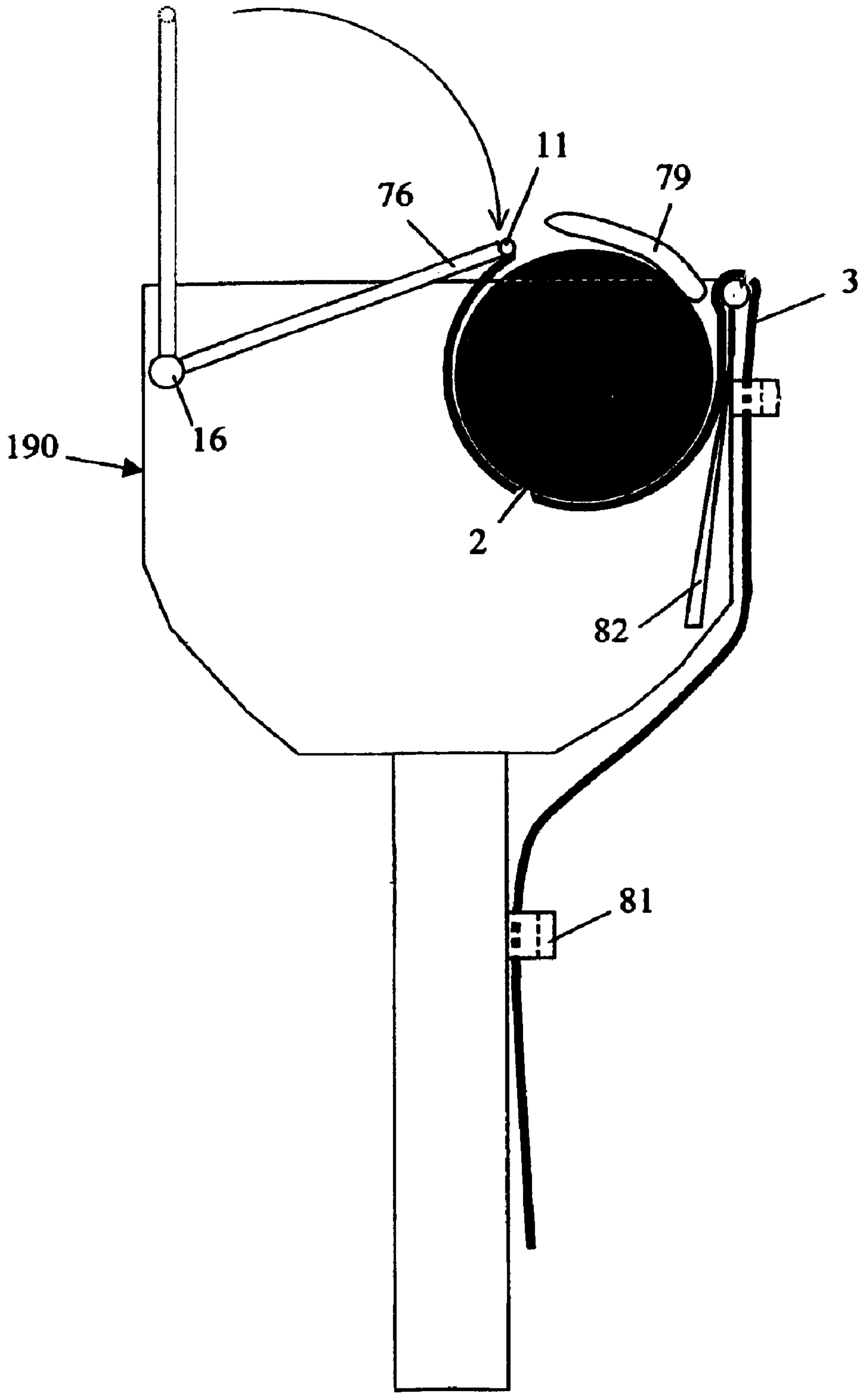
FIG. 19 is a bottom view of a hand held jar lid gripper device.
Figure 20:
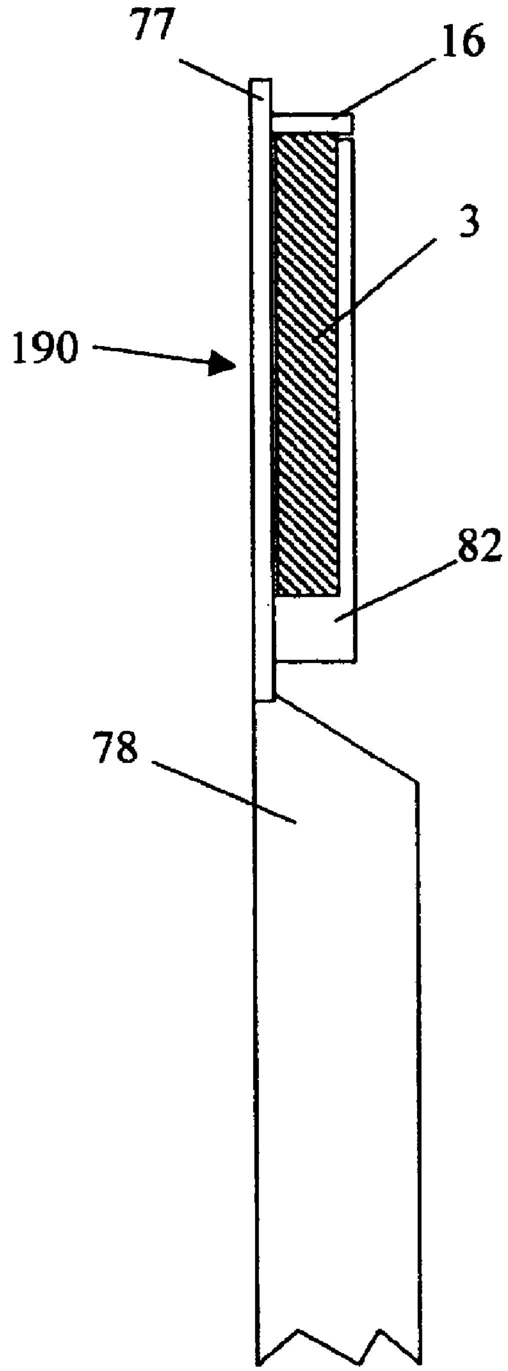
FIG. 20 is a side view of the hand held jar lid gripper device of FIG. 19.

FIGS. 19 and 20 show a hand held jar opener 190 using the pivot arm design. The pivot arm 76 and fixed ridge 82 are both smaller in dimensions as compared to the cabinet mounted gripper device 130, which may require that the user to take up the excess strap 3 length before use. To use, the user places the jar lid 1 in the tool as shown. The user pulls the loose end of the strap 3 and the jar lid 1 is cradled in place by ridge 79. The height of this cradling ridge 79 is roughly the same as the jar lid 1. Once the loose end of the strap 3 is pulled tight by the user, the jar lid 1 is ready for the user to unscrew it.

Figure 21:
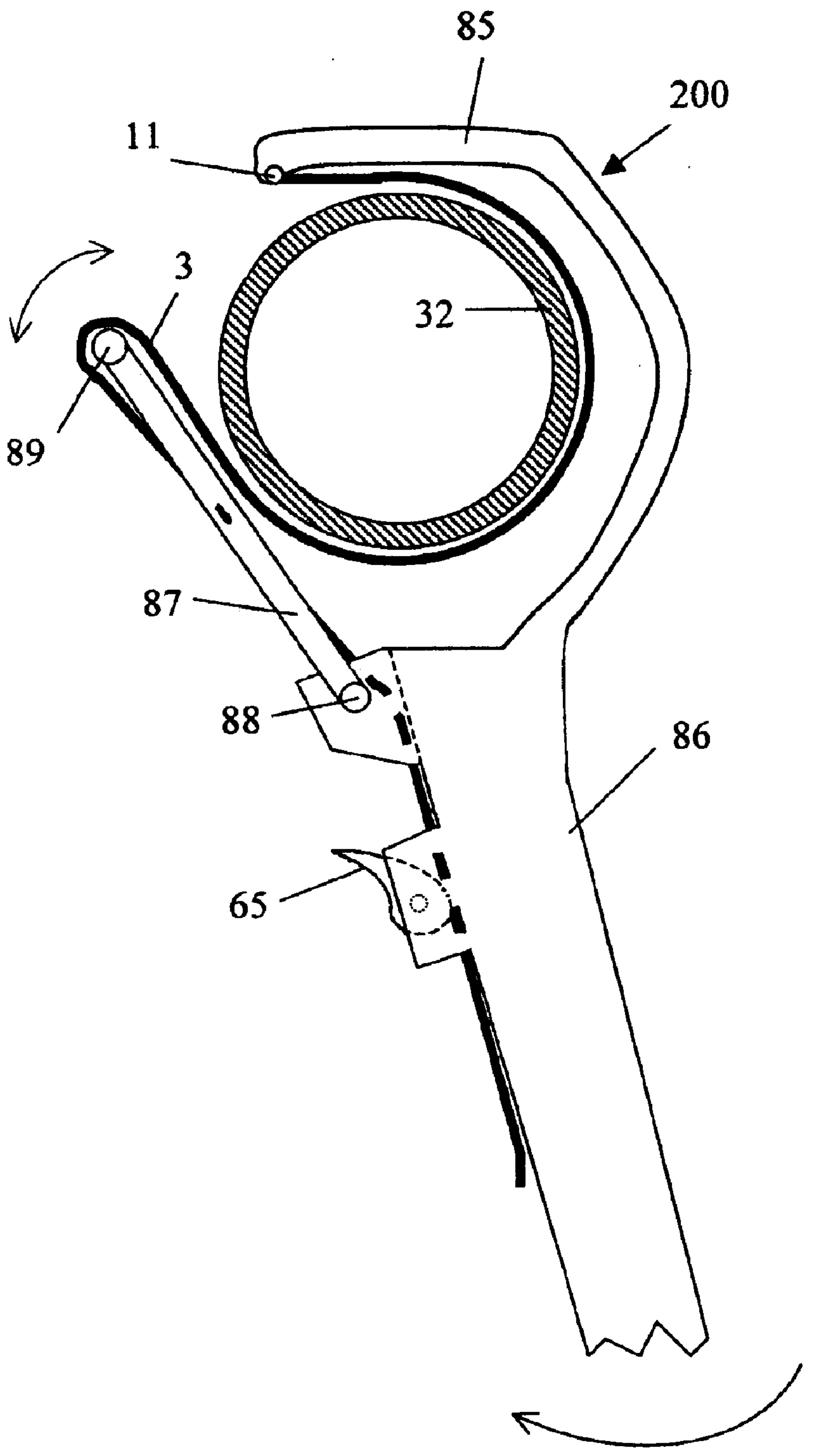
FIG. 21 is a top view of a hand held gripper device utilizing a pivot arm.
Figure 22:
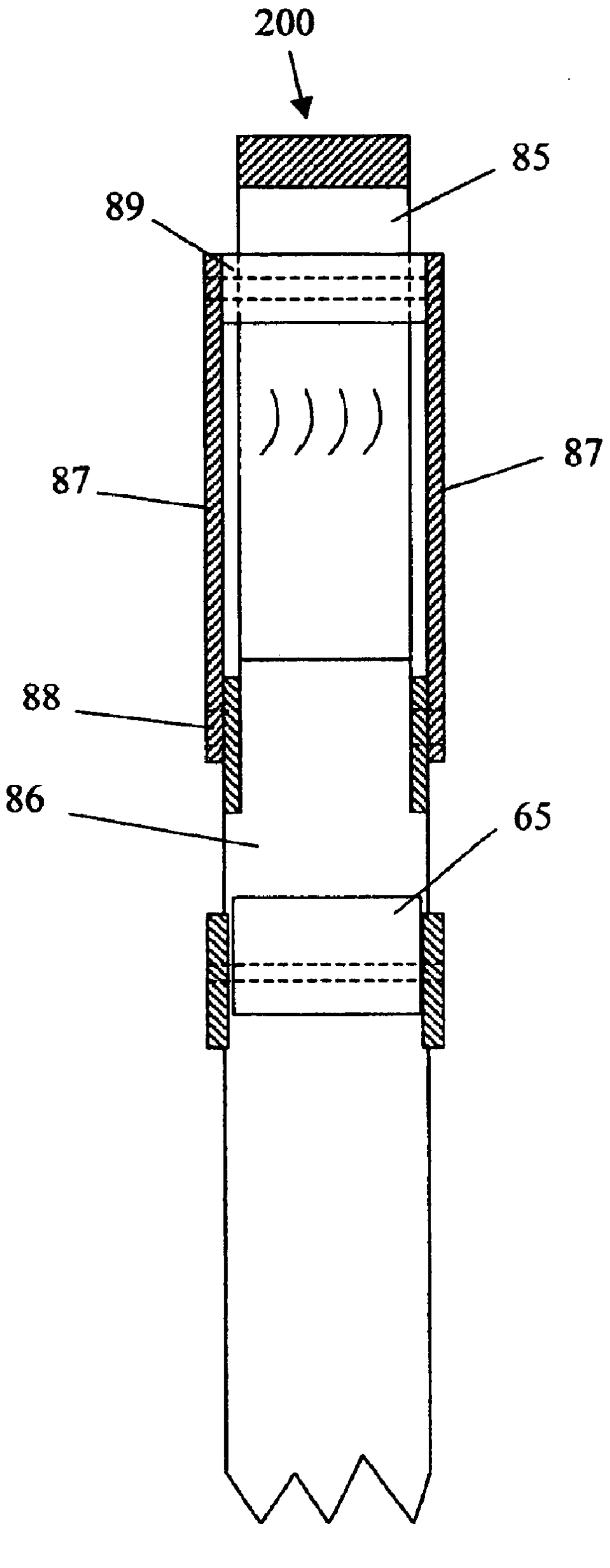
FIG. 22 is a side view of the hand held gripper device of FIG. 21.

FIGS. 21 and 22 show another embodiment of the gripper device in the form of a pipe wrench 200 utilizing a pivoting arm 87 and a cinching strap 3. The pipe wrench 200 has a handle 86, a curved stationary arm 85 that is fixed to the handle 86 and a pivot arm 87 at a pivot point 88 on the handle 86. The strap 3 is fixed at end 11 to stationary arm 85, and passes over a roller 89 on free end of pivot arm 87. Strap 3 passes through a lock 65 (e.g., a cam lock) to permit the working end of strap to be adjusted. One advantage of this pipe wrench 200 is that there is no need for the user to have to adjust the wrench before use with various sizes of pipe, etc, except for pulling the strap 3 tight. Shown in this figure is the side for loosening a pipe. To tighten a pipe, the user can simply flip the pipe wrench 200 over by 180 degrees to place the pivot arm 87 on an opposite side of the pipe. The pipe wrench's 200 handle 86 can be ergonomically designed for the user's comfort. The pipe wrench 200 can be offered in various sizes to accommodate a range of pipe sizes. The cinching strap 3 can be replaceable to thereby extend the useful life of the pipe wrench 200. The cinching strap 3 can be offered in soft rubber for delicate jobs, or even with metal links (e.g. steel or titanium links) with sharp teeth for jobs requiring a strong turning force.

Figure 23:
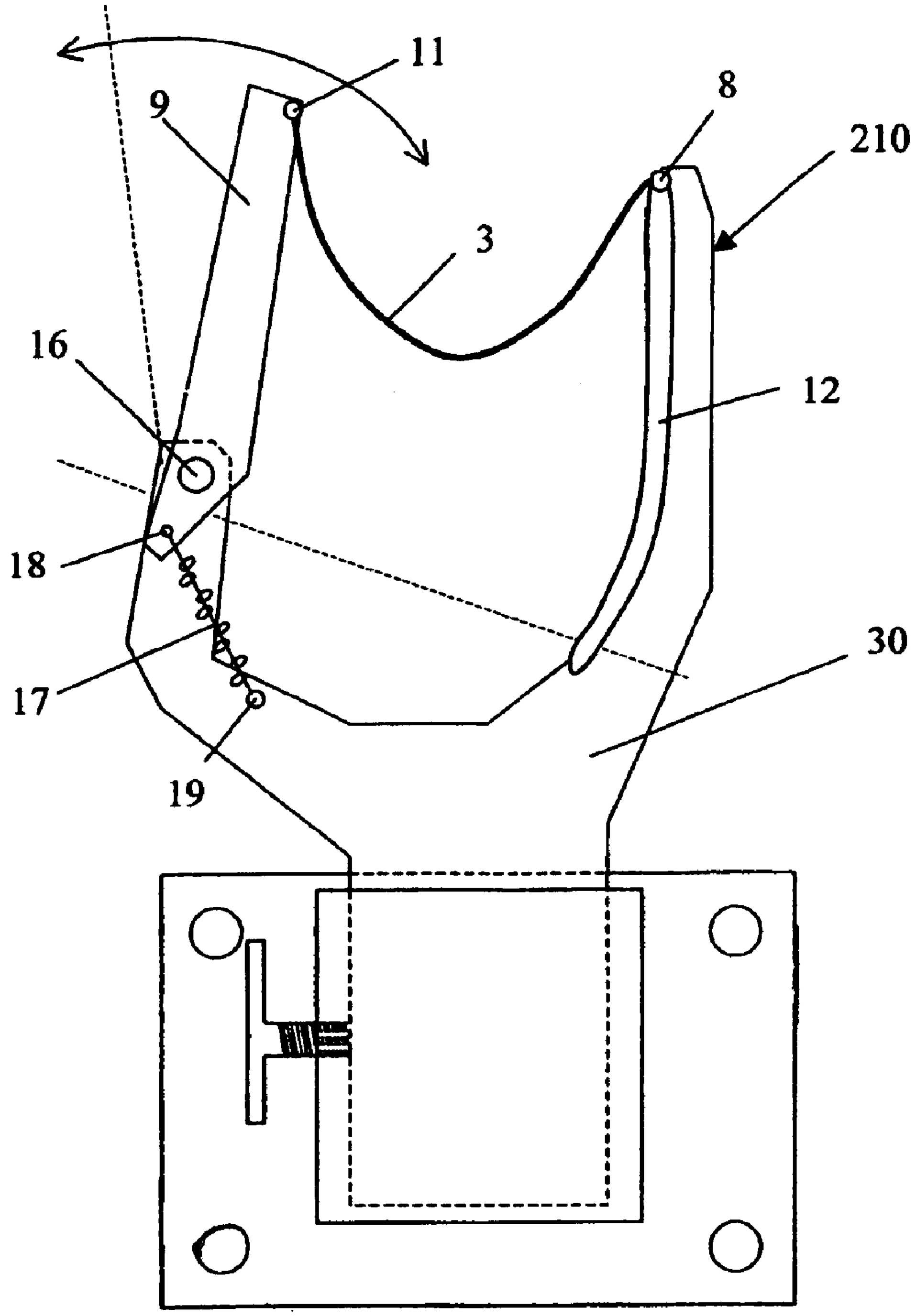
FIG. 23 is a top view of a bench mounted object gripping vice utilizing a pivot arm.

Lastly, FIG. 23 shows another embodiment of the invention as a bench or vehicle mounted pipe or object vise 210. The operation of the vise 210 is same as the other embodiments of the invention. A pipe is inserted and is gripped tightly when it is rotated.

The drawings in the foregoing description are not intended to represent the only form of the invention in regard to the details of its construction and manner of operation. In fact, it will be evident to one skilled in the art that modifications and variations can be made without departing from the spirit and scope of the invention. Although specific terms have been employed, they are intended in a generic and descriptive sense only and not for purposes of limitation.

What is claimed is:

1. A gripper device for loosening, tightening or gripping objects, comprising:

a support structure defining a planar support surface and having a fixed, object contact surface in the form of a fixed wall extending upwardly from the planar support surface;

a cinch strap with a first end and a second end, with the second end being attached to the support structure; and a pivot arm pivoted at one end to the support structure distant from the fixed wall and having a free end, wherein the first end of the cinch strap engages with the free end of the pivot arm, wherein the free end of the pivot arm is positioned relative to the fixed wall such that when an object to be gripped is brought to bear against the cinch strap, the pivot arm will pivot towards the fixed wall and the cinch strap will at least partially make contact with the fixed wall to cause the cinch strap to at least partially surround and grip onto the object to be gripped.

2. The gripper device of claim 1, wherein the cinch strap has a high friction surface to grip objects.

3. The gripper device of claim 1, wherein the first end of cinch strap is fixed to the free end of the pivot arm.

4. The gripper device of claim 3, further comprising a cinch strap engagement to retain the second end of the cinch strap to the support structure.

5. The gripper device of claim 1, wherein the support structure can be mounted to any other surface.

6. A gripper device for loosening, tightening or gripping objects, comprising:

a support structure having a fixed, object contact surface in the form of a fixed wall;

a cinch strap with a first end and a second end, with the second end being attached to the support structure; and a pivot arm pivoted at one end to the support structure and having a free end, wherein the first end of the cinch strap engages with the free end of the pivot arm, and a second end that engages with the support structure, wherein the free end of the pivot arm is positioned relative to the fixed wall such that when an object to be gripped is brought to bear against the cinch strap, the pivot arm will pivot towards the fixed wall and the cinch strap will at least partially make contact with the fixed wall to cause the cinch strap to at least partially surround and grip onto the object to be gripped, wherein the fixed wall has a ridge to align and prevent cinch strap slippage.

7. A gripper device for loosening, tightening or gripping objects, comprising:

a support structure having a fixed, object contact surface in the form of a fixed wall;

a cinch strap with a first end and a second end, with the second end being attached to the support structure; and a pivot arm pivoted at one end to the support structure and having a free end, wherein the first end of the cinch strap engages with the free end of the pivot arm, and a second end that engages with the support structure, wherein the free end of the pivot arm is positioned relative to the fixed wall such that when an object to be gripped is brought to bear against the cinch strap, the pivot arm will pivot towards the fixed wall and the cinch strap will at least partially make contact with the fixed wall to cause the cinch strap to at least partially surround and grip onto the object to be gripped, further comprising a spring to bias the pivot arm away from the fixed, object contact surface.

8. A gripper device for loosening, tightening or gripping objects, comprising:

a support structure having a fixed, object contact surface in the form of a fixed wall;

a cinch strap with a first end and a second end, with the second end being attached to the support structure; and a pivot arm pivoted at one end to the support structure and having a free end, wherein the first end of the cinch strap engages with the free end of the pivot arm, and a second end that engages with the support structure, wherein the free end of the pivot arm is positioned relative to the fixed wall such that when an object to be gripped is brought to bear against the cinch strap, the pivot arm will pivot towards the fixed wall and the cinch strap will at least partially make contact with the fixed wall to cause the cinch strap to at least partially surround and grip onto the object to be gripped, wherein the object contact surface has a non-slip surface.

9. A gripper device for loosening, tightening or gripping objects, comprising:

a support structure having a fixed, object contact surface in the form of a fixed wall;

a cinch strap with a first end and a second end, with the second end being attached to the support structure; and a pivot arm pivoted at one end to the support structure and having a free end, wherein the first end of the cinch strap engages with the free end of the pivot arm, and a second end that engages with the support structure, wherein the free end of the pivot arm is positioned relative to the fixed wall such that when an object to be gripped is brought to bear against the cinch strap, the pivot arm will pivot towards the fixed wall and the cinch strap will at least partially make contact with the fixed wall to cause the cinch strap to at least partially surround and grip onto the object to be gripped, further comprising a cover plate that is shaped in a manner to retain the cinch strap in the device.

10. A gripper device for loosening a lid of a container, comprising:

a support structure defining a planar support surface and having a fixed wall extending upwardly from the planar support surface;

a cinch strap with a first end and a second end, the second end being attached to the support structure; and a pivot arm pivoted at a pivot end to the support structure distant from the fixed wall and having a free end spaced away from the fixed wall, the first end of the cinch strap being engaged with the free end of the pivot arm, wherein when a lid of a container is pushed against the cinch strap between the cinch strap's first and second ends, the pivot arm will automatically pivot towards the fixed wall, and the cinch strap will at least partially make contact with the fixed wall and cause the cinch strap to at least partially wrap around and grip onto the lid to thereby allow a user to twist the container while the gripper device tightly holds the lid.

11. The gripper device of claim 10, wherein the cinch strap has a high friction surface to grip objects.

12. The gripper device of claim 10, further comprising a spring to bias the pivot arm away from the fixed wall.

13. The gripper device of claim 10, wherein the fixed wall has a non-slip surface.

14. A gripper device for loosening a twist on lid of a container, comprising:

a support structure defining a planar support surface and having a fixed wall extending upwardly from the planar support surface;

a cinch strap with a first end and a second end, the second end being attached to the support structure; and a pivot arm pivoted at a pivot end to the support structure distant from the fixed wall and having a free end spaced away from and generally in front of the fixed wall, the first end of the cinch strap being engaged with the free end of the pivot arm, wherein the device has an entrance defined by an area between the cinch strap's first and second ends in a general direction from the free end to the pivot end of the pivot arm, wherein when a lid is pushed into the entrance, the pivot arm will automatically pivot towards the fixed wall, and the cinch strap will at least partially make contact with the fixed wall and cause the cinch strap to at least partially wrap around and grip onto the lid to thereby allow a user to twist the container while the gripper device tightly holds the lid.

* * * * *